No. 661,632. Patented Nov. 13, 1900.
E. F. BISSONNETTE.
BAND CUTTER AND FEEDER.
(Application filed Dec. 5, 1899.)
(No Model.) 3 Sheets—Sheet 2.
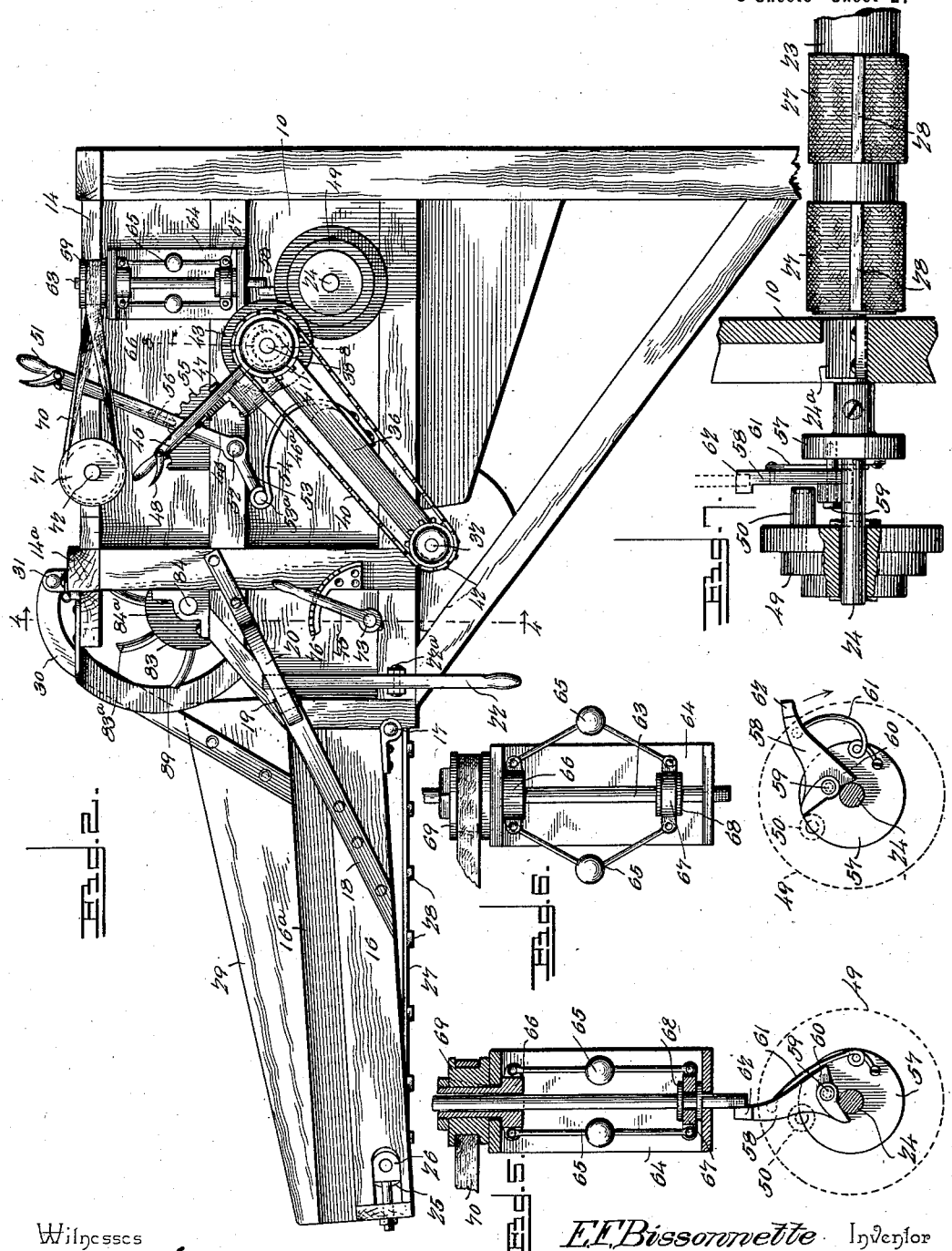
Witnesses
E. F. Stewart
W. H. Bumbard
E. F. Bissonnette Inventor
By his Attorneys,
C. A. Snow & Co.
THE NORRIS PETERS CO., PHOTO-LITHO., WASHINGTON, D. C.

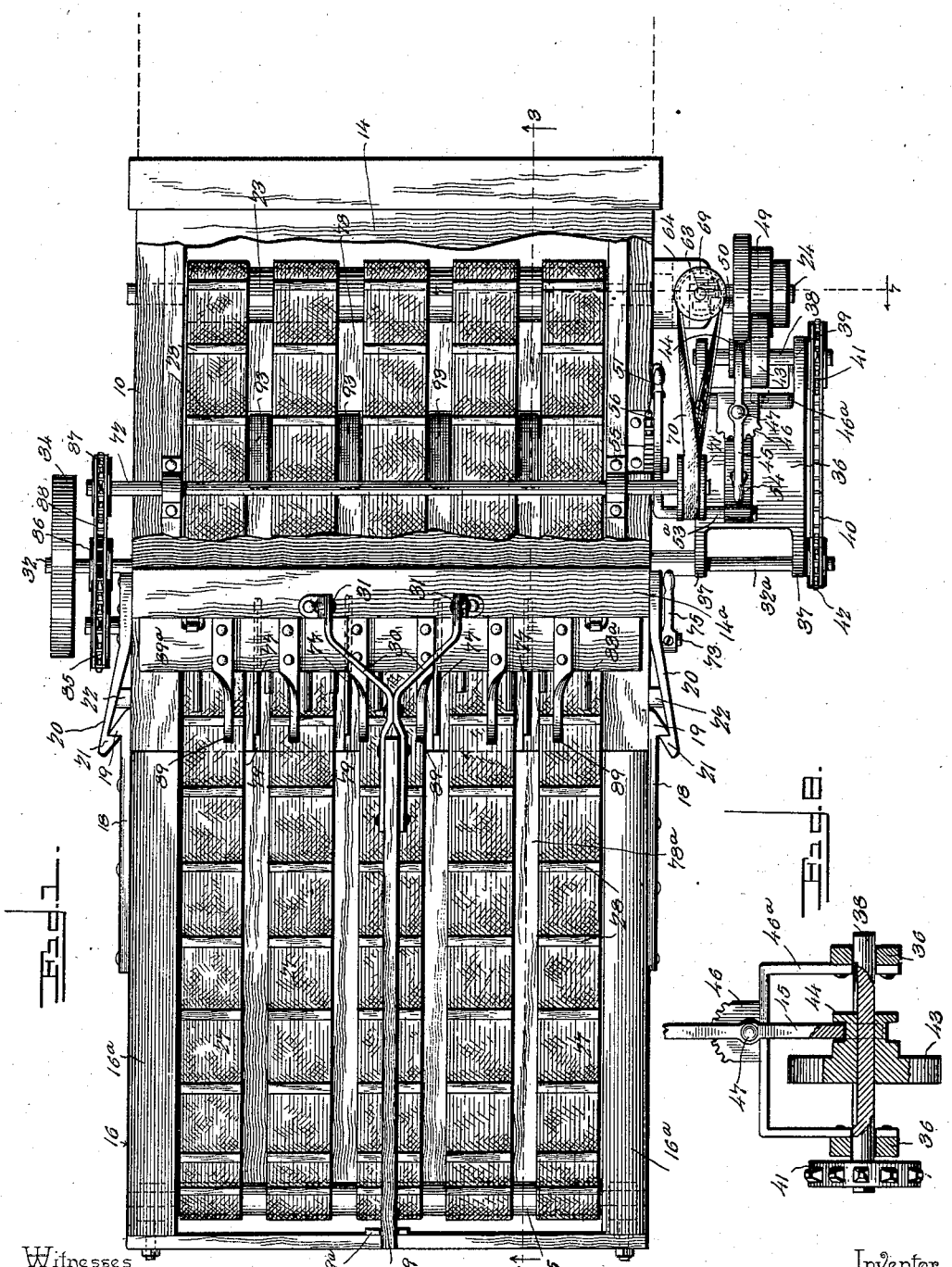

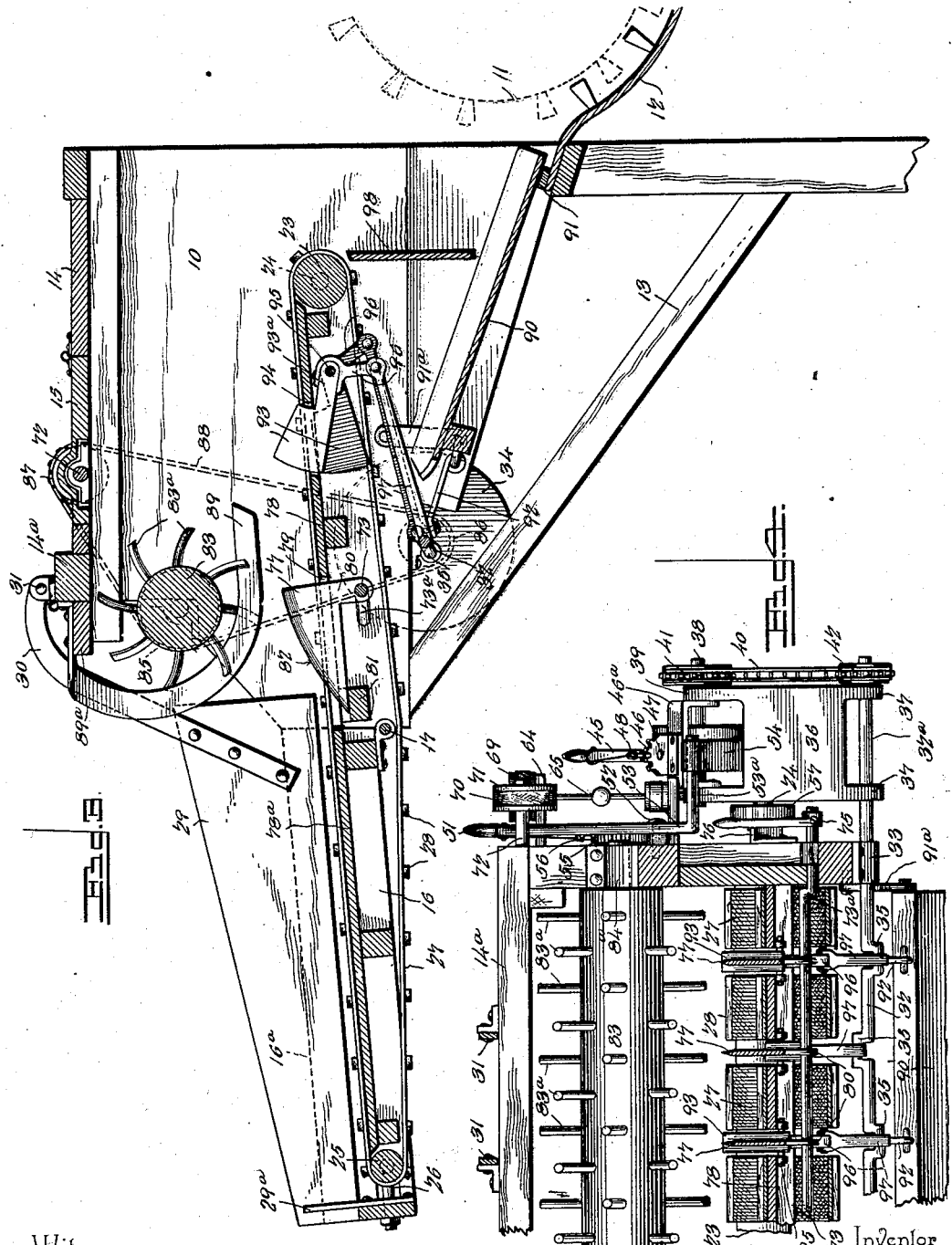

UNITED STATES PATENT OFFICE.

EDMOND F. BISSONNETTE, OF NASHUA, IOWA.

BAND-CUTTER AND FEEDER.

SPECIFICATION forming part of Letters Patent No. 661,632, dated November 13, 1900.

Application filed December 5, 1899. Serial No. 739,270. (No model.)

*To all whom it may concern:*

Be it known that I, EDMOND F. BISSONNETTE, a citizen of the United States, residing at Nashua, in the county of Chickasaw and State of Iowa, have invented a new and useful Band-Cutter and Feeder, of which the following is a specification.

My invention relates to improvements in band-cutters and feeders for grain-separators and threshing-machines; and the leading object thereof is to provide means for driving the grain-feeding mechanism at variable speeds to the separator and in accordance with the speed of the threshing-cylinder thereof.

A further object of the invention is to provide an improved band-cutter mechanism in which the straws are not liable to be wound around the cutter-shaft and interfere with the action of the knives, thus promoting the efficiency of the cutter mechanism.

A further object is to provide an improved means for loosening the straw after it passes the band-cutting devices, whereby the straw is fed in a loosened condition along with the free grain to the threshing mechanism of the separator.

A further object is to simplify the construction of the parts and increase the efficiency of the apparatus as a whole and also to enable the various parts to be folded compactly for convenience in transportation and storage.

With these ends in view the invention consists in the novel combination of mechanism and in the construction and arrangement of parts, which will be hereinafter fully described and claimed.

To enable others to understand the invention, I have illustrated the preferred embodiment thereof in the accompanying drawings, forming a part of this specification, and in which—

Figure 1 is a plan view of a band-cutter and feeder constructed in accordance with my invention, part of the hood or cover being broken away to illustrate the delivery ends of the feed-aprons and the positions of the agitators, the latter serving to loosen the straw after it passes the band-cutting devices. Fig. 2 is a side elevation of the band-cutter and feeder shown by Fig. 1. Fig. 3 is a longitudinal sectional elevation taken in the plane indicated by the dotted line 3 3 of Fig. 1 looking in the direction of the arrow. Fig. 4 is a partial vertical transverse section taken in the plane indicated by the dotted line 4 4 of Fig. 2 looking in the direction indicated by the arrow. Figs. 5 and 6 are enlarged detail views of the centrifugal governor mechanism operatively arranged with relation to the driven member of a clutch on the shaft of the driving-roller for the endless feed-apron. Fig. 7 is an enlarged detail sectional view in the plane indicated by the dotted line 7 7 of Fig. 1 looking in the direction of the arrow and showing the driving-roll for a series of endless feed-aprons, the cone-pulley for the shaft of said apron-driving roller, and the clutch mechanism. Fig. 8 is a detail fragmentary view on the line 8 8 of Fig. 2 to represent the shiftable friction-wheel adapted to drive the cone-pulley on the shaft of the apron-driving roll.

The same numerals of reference are used to indicate like and corresponding parts in each of the several figures of the drawings.

In carrying my invention into practice I employ a two-part frame for supporting the several mechanisms which constitute the improved band-cutter and feeder, and the stationary member 10 of this two-part frame is secured firmly by any approved means to a part of the casing or frame of the grain-separator or threshing-machine, the latter being equipped with the usual threshing-cylinder 11 and the concave 12, as partially represented by Fig. 2. This stationary member of the frame is stayed by the inclined braces or struts 13, and said frame member 10 is equipped with the hood or cover 14, the latter having a hinged board 15, which may be opened for the operator to obtain access to the chamber which is formed by the hood, whereby in the event of choking of the grain the latter may be loosened or removed by hand. The foldable member 16 of the frame has a hinged or pivotal connection 17 with the stationary frame member 10, and this foldable frame member is adapted to be maintained in alinement with or in proper relation to the frame member 10 by suitable latch devices. The hinged frame member may be dropped on its pivotal connection 17 to assume a folded relation to the stationary frame member when the band-cutter and feeder is not in use. As one means for sustaining the foldable frame member in alined relation with the stationary frame member I have shown the fastening-arms 18, secured firmly to opposite sides of said foldable member 16, said fastening means provided at their inner ends with the beaks 19, which are adapted to be engaged by the spring-latches 20. These latches are fastened to opposite sides of the stationary frame member, so that the shouldered ends 21 thereof will lie in the path of the beaks 19 on the fastening-arms, the parts being so arranged that the latches will snap into engagement with the arms on the elevation of the hinged frame member to its operative position. The latches may be readily disengaged from the fastening-arms by means of levers 22, arranged on opposite sides of the frame, and each fulcrumed at a point intermediate of its length, as at $22^a$, on the stationary frame member, the free end of each latch-operating lever being arranged between a side of the frame and one latch, so that moving the lever in one direction will force the spring-latch away from the beak of a fastening-arm.

The means for carrying the bundles of grain or straw through the band-cutter and feed mechanism to the threshing-cylinder consists of a plurality of slatted endless aprons, which are arranged longitudinally of the two-part frame, so as to be foldable with the hinged section thereof. The series of endless feed-aprons pass at the inner ends thereof around an apron-driving roller 23, the latter having its shaft 24 journaled in suitable bearings $24^a$ on the stationary frame member at a point contiguous to the threshing-cylinder 11, one end of said shaft 24 being extended or prolonged for a considerable distance beyond a side of the stationary frame member, as shown by Figs. 1, 4, and 7, for the reception of the variable-speed mechanism by which the apron-driving roller 23 may be rotated at different speeds in consonance with the speed of a threshing-cylinder. An idler-roller 25 has its shaft mounted in bearings 26 at the outer or free end of the hinged frame member, said idle roller lying parallel with the driving-roller 23 for the accommodation of a series of endless feed-aprons 27.

In the drawings I have represented a series of endless feed-aprons supported by the parallel idle driving-rollers, so that said aprons will lie in spaced relation one to the other throughout the width of the two-part supporting-frame 10 16, thus leaving spaces intermediate the edges of the apron for the band-cutting knives and the straw-feeding agitators to be operatively arranged relatively to the series of aprons, as will hereinafter appear. Each apron is equipped with a series of transverse slats 28, which are firmly secured to the apron so as to project beyond the exposed face thereof in order that the slats may catch in the straw to properly carry the latter to the threshing-cylinder, and the series of aprons are arranged, preferably, on their rollers for the transverse slats of one apron to lie in alinement with the slats on the other aprons of the series, as shown by Fig. 1, although this arrangement of the slats is not essential.

The hinged member of the two-part frame is provided at its sides with upwardly-extending and longitudinally-arranged guide-rails $16^a$, which are in alinement with the sides of the hood 14, said rails serving to prevent the straw from passing over the side of the feeder-frame. The straw-space between the guide-rails is divided by the employment of a longitudinally-arranged dividing-board 29. This dividing-board has its inner end secured firmly to the arched arms 30, which extend upward over the front edge of the hood 14, so that the arms may be hinged at 31 to a rail $14^a$ of the hood or cover. The hinged arms serve to support the inner end of the dividing-board in close relation to the feed-aprons and above the path of the slats thereon; but the free or unconfined end of the hinged dividing-board rests on a cross-rail at the free end of the frame member 16, (see Figs. 1 and 3,) said free end of the dividing-board being held against lateral displacement by means of the posts $29^a$, which are secured to said cross-rail of the frame member in positions to extend upwardly therefrom and embrace opposite sides of the dividing-board. The space between the guard-rails at the sides of the hinged frame member 16 is divided into two equal parts by arranging the dividing-board centrally over the hinged frame member, thus insuring uniform feed of the straw to the threshing-machine; but when the frame member 16 and the series of aprons thereon are folded in a downward direction the dividing-board 21 may be folded in an upward direction over and upon the hood 14, the dividing-board and its arms turning on the center afforded by the hinges 31.

I employ a horizontally-arranged crank-formed driving-shaft 32 for the operation of the driving-roller 23, for the series of endless feed-aprons, a series of agitators, and a shaking grain-pan, said agitators and the grain-pan to be hereinafter described; but this crank-formed driving-shaft is not geared directly to the apron-driving roller-shaft, because I employ a variable-speed mechanism between a part of the shaft 32 and the extended end of the shaft for the apron-driving roller. This crank-formed bearing-shaft is journaled in proper bearings 33, secured to the stationary frame member in positions for the cranks of the shaft to play below the series of endless feeders, one end of this shaft being equipped with a band-wheel 34, adapted to receive a belt which is driven from a part of the threshing-machine or grain-separator, thereby making provision for the operation of the shaft 32, which drives the moving elements of the band-cutter and feeder. The end of the shaft 32 opposite the end having the band-wheel 34 is extended at 32ª (see Fig. 4) beyond the side of the two-part frame, and on this extended end of the shaft 32 is loosely mounted an adjustable frame 36. This frame is shown by Figs. 1 and 4 as having the ears 37 fitted loosely on the shaft; but this means for mounting the frame may be varied. The shaft 32 is formed or provided between its bearing 33 with a series of cranks 35, the latter arranged in the vertical planes of the spaces between the series of endless feed-aprons.

The adjustable frame 36 is adapted to turn on the extended end 32ª of the crank-formed driving-shaft as its axis of motion, and this frame is inclined toward the shaft 24 of the apron-driving roller, as shown by Fig. 2, to present a friction-wheel 43 in operative relation to a stepped cone-pulley 49 on the roller-shaft 24, said friction-roll being thus carried by the adjustable frame, so as to be movable therewith toward or from the cone-pulley. The friction-wheel 43 is supported in the adjustable frame by a short counter-shaft 38, the latter being journaled in bearings 39 on said adjustable frame, so as to lie parallel with the extended end 32ª of the crank-formed driving-shaft and the extended end of the shaft 24 for the apron-driving roller. The counter-shaft 38 is made square or polygonal between its bearings in the adjustable frame, and a friction-wheel 43 has a squared central opening, which fits snugly on the squared part of the shaft, whereby the friction-wheel will rotate with the counter-shaft, and at the same time it is capable of being shifted laterally lengthwise of the shaft in a manner for the periphery of said wheel to lie in operative relation to either one of the steps or members on the stepped cone-pulley 49. It is thus to be observed that the friction-wheel is movable with the adjustable frame 36 toward or from the stepped pulley, and at the same time the friction-wheel is capable of an independent lateral adjustment on the counter-shaft for presenting its surface opposite either of the steps on the cone-pulley, whereby the speed of the cone-pulley may be varied in order to drive the apron-roller 23 and the endless feed-aprons at a speed in proportion to the speed of the threshing-cylinder for conveying the grain thereto as fast as it can be threshed by the threshing mechanism.

The counter-shaft 38 in the adjustable frame is provided at one end with a sprocket-wheel 41, which is engaged by an endless sprocket-chain 40, the latter being driven by a sprocket-wheel 42, which is fast with the extended end 32ª of the crank-formed driving-shaft. By mounting the adjustable frame 36 directly on the extended end of the crank-formed driving-shaft the counter-shaft and the friction-wheel carried thereby are adapted to be shifted in an arc concentric with the axis of the driving-shaft, and thus the sprocket-gearing is made to positively drive the counter-shaft and friction-wheel at all points in the adjustment thereof and of the frame 36 with relation to the driving-shaft. As a means for shifting the friction-wheel 43 on the polygonal section of the counter-shaft I have shown by Fig. 4 that the friction-wheel is provided with a grooved collar 44, in which is loosely fitted a forked end of a shipping-lever 45. A segment 46 is fastened by a yoke 46ª firmly to the adjustable frame 36, so that the segment will lie over the counter-shaft and the friction-wheel thereon, and the shifting lever is fulcrumed at 47 either to the segment or to the yoke in a position for the latch 48 on said lever to properly engage with the segment, whereby the lever may be locked in place to hold the friction-wheel in a position on the counter-shaft proper for the engagement of the friction-wheel with either step of the cone-pulley.

The adjustable frame 36 may be moved on the crank-formed driving-shaft by any suitable means; but as a proper means for moving the frame and holding it yieldably toward the cone-pulley in order that the friction-wheel may have the necessary frictional contact with said pulley I have represented an adjusting-lever 51 and a spring 54. This adjusting-lever is fulcrumed at 52 on one side of the stationary frame member 10, so as to lie substantially above the adjustable frame, and at one end the lever is formed with an arm 53, the latter having a stud 53ª, to which is connected one end of the spring 54. This spring is shown by Fig. 2 as a flat leaf-spring arched or curved to have one end thereof secured firmly to the adjustable frame 36, while the other end of the spring is connected with the stud and the lever-arm 53. An upright segment 55 is secured firmly to a rail of the stationary frame member alongside of the lever 51, and the latch 56 is carried by this lever in position to engage with the segment. An adjustment of the lever 51 for its latch to enter the lowermost notch in the segment 55 moves the lever-arm 53 in an upward direction, so as to draw on the spring 54 and move the frame 36 and the friction-wheel away from the cone-pulley, thus permitting the lever 45 to be operated for shifting the position of the friction-wheel 43 lengthwise along the counter-shaft to a proper position for engagement with a step on the cone-pulley. When the friction-wheel is adjusted on the counter-shaft to engage frictionally with the large member or step of the cone-pulley, the lever 51 does not require to be adjusted for any considerable distance in order to make the spring 54 press the friction-wheel into proper engagement with the cone-pulley. When the friction-wheel is adjusted on the shaft 38 to engage with the intermediate or middle member of the cone-pulley, the lever 51 should be adjusted to the position shown by Figs. 1 and 2 for its latch to engage with the fixed segment 55 at about the middle thereof, so that the spring 54 will press the frame in a direction for the friction-wheel to drive the cone-pulley; but on adjustment of the friction-wheel to engage with the smallest member of the cone-pulley the lever 51 should be adjusted to the left in order that the spring 54 may hold the friction-wheel in engagement with the cone-pulley. It is thus to be observed that the frame 36 is shiftable to variable positions to compensate for the different diameters of the step-pulley and that in each position of this frame the spring 54 exerts pressure or tension on the frame for the friction-wheel to have frictional contact with the cone-pulley necessary to drive the latter from the counter-shaft, which is in turn driven from the crank-formed driving-shaft.

The stepped cone-pulley is mounted idly or loosely on the extended end of the shaft for the apron-driving roller 23, (see Fig. 7,) and this pulley is adapted to be coupled fast with the shaft 24 by a governor-controlled clutch mechanism, which when the parts are driven at slow speed serves to maintain the cone-pulley idle on the shaft; but as the speed is increased to attain the proper limit the centrifugal governor is freed automatically from the clutch, which is thereupon moved into operative relation with a part of the cone-pulley, so that the latter is made fast with the shaft 24 of the apron-driving roller for the purpose of propelling the latter at the required speed, the speed of the endless feed-aprons being determined by the engagement of the friction-wheel 43 with a member of the cone-pulley.

The cone-pulley is provided on its side which faces the stationary frame member with a stud or friction-roller 50, and a clutch-disk 57 is made fast to the extended end of the shaft 24 for the apron-driving roller 23, reference being had more particularly to Figs. 1, 5, 6, and 7. A clutch-lever 58 is fulcrumed on this disk 57, so as to lie between the opposing faces of the disk and the cone-pulley. The inner end of the clutch-lever is enlarged to form a wide heel 60, and this part of the lever is connected to the disk 57 by the fulcrum pin or bolt 59, whereby in the position of the lever shown by Fig. 6 one edge of the heel is disposed in the path of the stud or roller 50 on the cone-pulley, while the other end of the heel bears against the shaft 24, so that the clutch-lever and the stud or roller will operate to make the cone-pulley fast with the shaft 24. It is to be observed that in this position of the clutch-lever an edge of the heel 60 bears firmly upon the shaft to relieve the lever-fulcrum 59 from undue strain and pressure. In the normal position of the parts the clutch-lever 58 is held by a spring 61 for the nose 62 of the lever to lie out of the path of a governor-shaft 63, the latter serving as a stop or detent to hold the lever 62 in the position shown by Fig. 5, wherein the heel 60 is out of the path of the cone-pulley stud or roller 50, thus permitting the stud or roller to turn without striking the lever and the cone-pulley to turn idly on the shaft when the clutch-lever is under the restraint of the shaft forming a part of the governor mechanism. This governor-shaft is mounted to slide freely or to have endwise movement in a stationary bracket 64, which is fastened firmly to a side of the stationary frame member above the extended end of the shaft 24. The centrifugal governor mechanism comprises the shaft 63, the yieldable and weighted arms 65, a driving-sleeve 66, and a collar 67. This collar is confined loosely on the governor-shaft between a pair of spaced disks 68, which are made fast with the shaft, near the lower end thereof; but the sleeve 66 is also loose on the upper part of the governor-shaft, so that it will rotate thereon, the weighted arms of the governor being connected pivotally with the slidable and rotary collar and with the sleeve 66. Said sleeve 66 is mounted in the upper part of the bracket 64 to rotate freely therein and to be restrained from endwise play thereby; but as the governor-shaft is idly fitted in or slidably connected with this sleeve said shaft may slide through the sleeve under the centrifugal force of the weighted arms and the collar 67, which collar acts on one of the disks 68, to impart the slidable movement to the governor-shaft for withdrawing the lower end of said shaft out of the path of the nose on the clutch-lever. The centrifugal governor mechanism is rotated by suitable connections with the crank-formed driving-shaft 32, so as to be propelled thereby independently of the train of gearing between the stepped cone-pulley and the end 32ª of said crank-formed driving-shaft. One of this train of operative connections is a pulley 69, which is made fast with the governor-driving sleeve 66, said pulley receiving a belt 70, which passes around a pulley 71 on a horizontal governor-driving shaft 72, the latter being journaled in suitable bearings on the hood 14, so as to lie transversely across the frame of the band-cutter and feeder mechanism.

I employ a series of normally stationary band-cutting knives which are adjustably supported in a slotted table 78, secured in the lower part of the stationary frame member 10, so as to lie in alinement with a table-section 78ª, the latter carried by the foldable frame member 16; but these knives are adjustable, so as to be projected more or less above the path of the endless feed-aprons. The slots 79 in the table within the stationary frame member are formed directly over a cutter-adjusting shaft 73 and in the intervals between the endless feeder-frame or a continuous slot may be provided across the table, if desired. The knife-adjusting shaft is supported in suitable bearings in the stationary frame member, so as to lie between the upper and lower leads of the endless feed-aprons, and this shaft is formed with a bent portion 73ª. On one end of the shaft is secured a hand-lever 75, adapted to be engaged with the segment 76, fixed to one side of the stationary frame member, (see Fig. 2,) said lever and segment serving to hold the shaft and the series of band-knives 77 in their adjusted positions. The band-knives are arranged vertically in the slots 79 of the casing, so as to lie between the edges of the feed-aprons and to project above the path of the slats 28 on the upper leads thereof. Each band-knife is provided with a heel 80, which is connected loosely to the knife-adjusting shaft, and the free ends of the knives rest upon a rail 81, which is secured horizontally to the stationary frame member. (See Fig. 3.) Each knife has its upper edge 82 curved so as to present a sloping cutting edge to the advancing bands on the shocks of grain as they are carried toward the threshing-cylinder, whereby the cutting edges of the knives are curved or sloped in an opposite direction to the path of travel of the bands and shocks. The shaft 73 is held by the lever and segment in a position to make the cutting edges of the knives project above the slatted upper leads of the endless aprons, in order that the cutting edges of the knives may operate efficiently on the bands which confine the shocks of grain; but it is evident that the shaft may be adjusted by manipulating the lever to vary the position of the blades relative to the path of the shocks and bands and a revoluble beater-cylinder 83. It is to be understood that the band-cutting knives of my invention normally occupy stationary positions between the series of spaced feed-aprons, although the knives may be raised more or less by adjustment of the shaft and lever, and this fixed position of the knives is an important part of my invention, because the straws are not liable to be wound or twisted around a rotary shaft or cutter-blade.

The revoluble beater has its shaft 84 journaled in suitable bearings 84$^a$, so as to lie in the vertical plane of the band-cutting knives, and the beater-cylinder 83 has a series of curved arms or spikes 83$^a$, which clear the cutting edges of those knives that lie in the plane of certain spikes or arms on the cylinder. The beater-shaft has its sprocket-wheel 85 made fast therewith in the longitudinal vertical plane of other sprocket-wheels 86 87, which are secured to the crank-formed driving-shaft 32 and the governor-driving shaft 71, respectively. (See Fig. 1 and dotted lines in Fig. 3.) An endless sprocket-chain 88 engages with the sprocket-wheels 85, 86, and 87, so as to be propelled from the driving-shaft 32 and to rotate the governor-driving shaft 71 and the beater-shaft 84. This beater is positively driven in a direction to coact with the endless feed-aprons to advance the grain to the threshing-cylinder, and the beater serves to press the shocks of grain downward toward the band-cutting knives. To prevent the straw from winding around the beater shaft or cylinder, I employ the curved band-cutting knives 89, which are secured at one end to a rail 89$^a$ of the hood 14, said knives being curved in a downward direction beneath the beater-cylinder and extended rearwardly beyond the vertical plane thereof, the knives alternating with certain of the spikes on the beater-cylinder. The upper curved knives are arranged to prevent the straw from passing up with the beater-spikes and winding around the beater-cylinder to assist the revoluble beater in pressing the shocks of grain toward the band-knives and to assist in cutting the bands.

A shaking grain-pan 90 is arranged in an inclined position under the delivery end of the series of endless aprons, and this grain-pan is slidably fitted on the cross rail or rails 91. The grain-pan inclines toward the concave of the threshing-cylinder, and its upper front end is suspended by pivoted links 91$^a$. Said grain-pan is connected operatively with one or more cranks of the crank-formed driving-shaft 32 by means of pitmen 92, and thus the shaft 32 is made to vibrate or shake the inclined grain-pan in order that the loose grain which may lodge therein may be delivered to the concave of the threshing-cylinder.

Another important feature of my band-cutter and feeder consists of a series of agitator-blades 93, which are arranged in rear of the series of band-knives and the beater-cylinder, said agitator-blades working in slots 94, which are formed in the table 78, so that said agitators are in alinement with the band-cutting knives and in the spaces between the feed-aprons. These agitator-blades have the shanks 93$^a$, fitted to or hung loosely on a horizontal rod or arbor 95, and each blade 93 is formed with a downwardly-extending heel 96. The series of heels of the agitator-blades are connected with the cranks 35 of the shaft 32 by the series of pitmen 97. The agitator-blades are arranged in staggered relation to the pivotal shaft or arbor 95, and they project through the slots 94 in the table, so as to extend above the path of the slats on the upper leads of the endless feed-aprons. By mounting the agitator-blades on a horizontal rod or arbor and connecting them with the crank-shaft the agitators are vibrated in vertical planes in rear of the knives and the beater-cylinder, whereby the agitators serve to loosen the straw which may be compacted by the beater-cylinder and deflecting-arms, so that the straw will be fed in a loosened condition to the threshing-cylinder.

A straw-detaining board or plate 98 is supported in a stationary frame member 10, below the delivery end of the feed-aprons and above the shaking grain-pan, said board or plate preventing the straw from passing toward the front with the slats on the return-leads of the feed-aprons.

The operation may be described as follows: The operator adjusts the friction-wheel 43 to engage with the step of the cone-pulley according to the desired rapidity of feed, the rate of the feed being proportionate to the speed of the threshing-cylinder. When the parts are at rest or the driving-shaft rotates at slow speed, the weight of the governor-arms depresses the governor-shaft 63 into engagement with the nose of the clutch-lever, and said lever is thus held out of the path of the stud or roller 50 on the cone-pulley for the latter to turn idly on the shaft 24, thereby permitting the roller 23 to remain at rest and the feed-aprons to remain stationary, while the agitator and the grain-pan are reciprocated and the beater-cylinder and the shaft 71 are rotated. When the shaft 32 attains the desired speed, the shaft 71 transmits the motion to the governor-shaft, and the centrifugal force of the weighted arms lifts the collar 67, which in turn raises the governor-shaft, so as to retract the latter from the path of the clutch-lever. The spring 61 then impels the clutch-lever to the position shown by Fig. 6 for the heel to be interposed in the path of the stud or roller 50 on the cone-pulley, the governor-shaft being held in its raised position by the weighted arms of the governor, which is driven from the shaft 71. The counter-shaft 38 transmits the motion of the shaft 32 through the friction-wheel and cone-pulley to the shaft 24 of the apron-driving roller 23, and the aprons are thus given an impelling motion. The grain is deposited upon the slatted aprons, so as to carry the same beneath the beater-cylinder and the deflecting-arms. The grain is depressed by said upper knives 89 and the cylinder upon the lower band-knives for the two series of knives to sever the bands which confine the grain in shocks. The aprons and cylinder coact to carry the grain beyond the knives, and the vibrating agitators then act upon the grain to loosen the latter before it passes over the inner end of the apron. The straw and loosened grain may drop upon the shaking pan 90, which is driven from the shaft 32, and the straw in a loosened condition, together with any free particles of grain which may lodge upon the pan, are thus delivered to the threshing mechanism of the grain-separator or threshing-machine.

I do not desire to limit myself to the precise form and construction of devices hereinbefore described, as it is evident that modifications may be made therein without departing from the spirit of my invention.

Having thus described the invention, what I claim is—

1. In a band-cutter and feeder, the combination with an endless feed mechanism, a main driving-shaft, and a feed-apron-driving shaft, of a pulley mounted idly on said apron-driving shaft, and having a tappet, a spring-pressed clutch-lever having an element normally in the path of the tappet on the idle pulley, said clutch-lever being fulcrumed on a disk fast on said apron-driving shaft and a centrifugal governor having an endwise-movable shaft located and adapted to directly engage said clutch-lever, for the purpose set forth, substantially as described.

2. In a band-cutter and feeder for threshing-machines, the combination of a table, endless feed-aprons traveling thereon, the sector-shaped adjustable band-cutting knives disposed between said endless feed-aprons, having their front ends rigidly supported and their rear ends provided with depending heels, an adjusting crank-shaft on which said heels of said knives are supported, and feeding and cutting devices above said aprons and said adjustable band-cutting knives, substantially as described.

3. In a band-cutter and feeder for threshing-machines, the combination of a table, endless feed-aprons traveling thereon, relatively-fixed band-cutting knives projecting above said table and disposed between said endless aprons, feeding and cutting devices above said aprons and said relatively-fixed band-cutting knives, pivoted rocking agitator-blades disposed between said endless aprons, in rear of said relatively-fixed band-cutting knives and movable vertically in openings in the table, the crank-shaft, and pitmen connecting said crank-shaft to said rocking agitators, to operate the latter, substantially as described.

4. In a band-cutter and feeder for threshing-machines, the combination with a series of upper band-cutting knives and a feeding and beating cylinder having arms disposed between the same, of the feed-table, the endless feed-aprons having one lead traveling thereon, the sector-shaped adustable band-cutting knives disposed under the upper knives and below said feeding and beating cylinder, said lower knives having their front ends rigidly supported and their rear ends provided with depending heels and an adjusting crank-shaft on which said heels, of said lower knives are supported, whereby the latter may be vertically adjusted toward and from the upper band-cutting knives, substantially as described.

5. In a band-cutter and feeder, the combination with a feed mechanism, a main driving-shaft, and a shaft for driving the feed mechanism, of a variable-speed driving mechanism including a shiftable frame and a friction-wheel normally propelled by the main driving-shaft, said friction-wheel being shiftable on the frame independently of the adjustment of the latter, and a speed-gear member fast with the feed-mechanism driving-shaft and arranged to have frictional engagement with the shiftable friction-wheel under all adjustments of the latter, substantially as described.

6. In a band-cutter and feeder, the combination with a main driving-shaft, a feed mechanism and a shaft for propelling the feed mechanism, of a stepped pulley carried by the feed-mechanism drive-shaft, an adjustable frame movable in an arc concentric with the axis of the main driving-shaft, a counter-shaft journaled in the frame to be adjustable therewith and geared to the main driving-shaft, and a shiftable friction-wheel mounted on the counter-shaft and adapted to engage frictionally with either member of the stepped pulley, substantially as described.

7. In a band-cutter and feeder, the combination with a feed mechanism, a main driving-shaft and a shaft for propelling the feed mechanism, of an adjustable frame mounted loosely on the main driving-shaft, a counter-shaft carried by said frame and geared to the main driving-shaft, a stepped pulley on the shaft for the feed mechanism, a friction-wheel on the counter-shaft, a lever for shifting the position of the adjustable frame and the friction-wheel laterally with respect to the stepped pulley, and means for normally pressing the friction-wheel into frictional engagement with the stepped pulley, substantially as described.

In testimony that I claim the foregoing as my own I have hereto affixed my signature in the presence of two witnesses.

EDMOND F. BISSONNETTE.

Witnesses:
CHARLES BISSONNETTE,
P. W. BURR.